Patented May 18, 1948

2,441,559

UNITED STATES PATENT OFFICE 2,441,559

LUMINESCENT COATED ARTICLES

Harry Burrell, Paramus, and Christy J. Vander Valk, Clifton, N. J., assignors to Heyden Chemical Corporation, New York, N. Y., a corporation of Delaware No Drawing. Application December 1, 1943, Serial No. 512,476

8 Claims. (Cl. 117—33.5)

This invention relates to compounds capable of transforming ultra-violet light energy into visible-light energy. Such compounds are useful as luminescent pigments which may be incorporated in plastic materials or in suitable vehicles for the production of coating compositions.

A variety of materials are known to the art which have the property of luminescing under ultra-violet light. Most of these are very expensive, and luminescent dyestuffs in particular may possess undesirable solubility characteristics. The products of this invention have the advantage of being inexpensive, very simply and easily prepared, and of being substantially insoluble in most of the common solvents, including water. Compared with inorganic pigments, the products of this invention are considerably lower in specific gravity, which means that fewer parts by weight are required to produce a given luminescence in a coating composition or plastic mass. It has also been discovered that by varying the metallic constituents of the new luminescent salts the color of the luminescence may be varied through shades of yellow, green, tan, orange, and blue.

These novel luminescent materials are prepared by reacting beta-oxynaphthoic acid with metallic compounds so that the metal salts of the acid are produced. Commercial beta-oxynaphthoic acid, which is prepared by the carbonation of an alkali-metal salt of beta-naphthol, is also known as beta-hydroxynaphthoic acid, 3-hydroxynaphthoic acid, 3-hydroxy-2-naphthoic acid, 2,3-naphthol carboxylic acid, and 3-hydroxynaphthalene-2-carboxylic acid. It is a yellow solid material that crystallizes in yellow rhombic leaflets and has a melting point, when pure, of 217.5-219° C. and is only feebly luminescent. Since most of these salts of beta-oxynaphthoic acid, except those of the alkali metals, are insoluble in water, a convenient way to prepare the salts is to precipitate them from an aqueous solution of the acid or an alkali-metal salt of the acid by adding a solution of the desired reacting metallic ion. For example, if a solution of aluminum sulfate is added to a solution of the sodium salt of beta-oxynaphthoic acid, the aluminum beta-oxynaphthoate is precipitated. This precipitate may be filtered off and dried to provide a greenish yellow substance which glows with a greenish yellow shade when exposed to ultra-violet light.

*Example 1.*—A number of the metallic beta-oxynaphthoates were prepared by dissolving 25 parts by weight of beta-oxynaphthoic acid in 250 parts of water containing 7 parts of sodium carbonate. To portions of this solution were added aqueous solutions containing stoichiometric equivalents of the respective metallic salts listed in the table below. Each of the precipitates which formed was filtered off and dried at 110° C. They were found to be easily friable and were pulverized to form light fluffy powders which had the daylight colors and ultra-violet luminescing colors listed in the table. The aluminum, barium, calcium, cadmium, and beryllium salts of beta-oxynaphthoic acid were found to luminesce with great intensity, and the other salts listed in the table glowed with slightly less intensity. The acid itself is only feebly luminescent.

| Metal Salt Used for Preparation of beta-Oxynaphthoate | Color of Luminescence of Metal beta-Oxynaphthoate | Daylight Color of Metal beta-Oxynaphthoate |
|---|---|---|
| Aluminum Sulfate | Green Yellow | Light Yellow. |
| Barium Nitrate | Lemon Yellow | Gray. |
| Calcium Chloride | ----do---- | Tan. |
| Cadmium Sulfate | Yellow | Light Yellow. |
| Beryllium Nitrate | Blue | Do. |
| Lead Acetate | Tan | Do. |
| Zinc Carbonate | Green Yellow | White. |
| Magnesium Acetate | Tan | Light Tan. |
| Tin Chloride | Green Yellow | Yellow |
| Bismuth Nitrate | Light Green | Light Yellow. |
| Nickel Carbonate | Olive Green | Light Green. |
| Antimony Chloride | Yellow Green | Tan. |
| Copper Sulfate | No Luminescence | Brown. |
| Iron Chloride | ----do---- | Black. |

*Example 2.*—The aluminum, barium, calcium, and cadmium beta-oxynaphthoates were each wet down with an equal weight of linseed oil, and the paints so prepared were examined under ultra-violet light. The luminescence of the pigments was not inhibited. This procedure was also repeated with a 50% solids urea-formaldehyde-butanol resin, and again the products were satisfactorily luminescent. The pigments of this invention are useful in paints, enamels, printing inks, and other coating compositions. Such products are used to render objects visible from illumination by ultra-violet light, such as for example an argon glow lamp. Signs, curbs, door sills, pictures, light switches, and the like are objects which may be suitably coated with such paint products. Maps and other matter suitable for examining in the dark may be printed from inks containing these pigments. Suitable vehicles for such products are well known in the art, and include drying oils, natural and synthetic resins, such as alkyds, phenolics, ureas, vinyls, methacrylates, etc., varnishes, lacquers and the like.

Plastic masses may be formed from the common materials such as phenolics, ureas, vinyls, including polystyrene and polymethyl methacrylate, casein, and their plastic equivalents, by combining these luminous pigments with the said plastics by any of the methods well known to the art.

Having thus described our invention, what we claim as new and desire to secure by Letters Patent is:

1. An object having a surface coating deposited from a composition consisting of conventional ingredients of surface coating compositions including a binder and such a proportion of a salt of 3-hydroxy-2-naphthoic acid and a metal selected from the group consisting of aluminum, barium, calcium, cadmium, beryllium, lead, zinc, magnesium, tin, bismuth, nickel, and antimony that the dried film deposited therefrom luminesces under ultra-violet light and a source of ultra-violet light in proximity to the said object.

2. An object having a surface coating deposited from a composition consisting of conventional ingredients of surface coating compositions including a binder and such a proportion of the aluminum salt of 3-hydroxy-2-naphthoic acid that the dried film deposited therefrom luminesces under ultra-violet light and a source of ultra-violet light in proximity to the said object.

3. An object having a surface coating deposited from a composition consisting of conventional ingredients of surface coating compositions including a binder and such a proportion of the cadmium salt of 3-hydroxy-2-naphthoic acid that the dried film deposited therefrom luminesces under ultra-violet light and a source of ultra-violet light in proximity to the said object.

4. An object having a surface coating deposited from a composition consisting of conventional ingredients of surface coating compositions including a binder and such a proportion of the beryllium salt of 3-hydroxy-2-naphthoic acid that the dried film deposited therefrom luminesces under ultra-violet light and a source of ultra-violet light in proximity to the said object.

5. An object having a surface coating deposited from a composition consisting essentially of a drying oil and such a proportion of a salt of 3-hydroxy-2-naphthoic acid and a metal selected from the group consisting of aluminum, barium, calcium, cadmium, beryllium, lead, zinc, magnesium, tin, bismuth, nickel, and antimony that the dried film deposited therefrom luminesces under ultra-violet light and a source of ultra-violet light in proximity to the said object.

6. An object having a surface coating deposited from a composition consisting essentially of a drying oil and such a proportion of the aluminum salt of 3-hydroxy-2-naphthoic acid that the dried film deposited therefrom luminesces under ultra-violet light and a source of ultra-violet light in proximity to the said object.

7. An object having a surface coating deposited from a composition consisting essentially of a drying oil and such a proportion of the cadmium salt of 3-hydroxy-2-naphthoic acid that the dried film deposited therefrom luminesces under ultra-violet light and a source of ultra-violet light in proximity to the said object.

8. An object having a surface coating deposited from a composition consisting essentially of a drying oil and such a proportion of the beryllium salt of 3-hydroxy-2-naphthoic acid that the dried film deposited therefrom luminesces under ultra-violet light and a source of ultra-violet light in proximity to the said object.

HARRY BURRELL.
CHRISTY J. VANDER VALK.

REFERENCES CITED

The following references are of record in the file of this patent:

UNITED STATES PATENTS

| Number | Name | Date |
| --- | --- | --- |
| 1,511,874 | Eder | Oct. 14, 1924 |
| 1,700,546 | Schwenk | Jan. 29, 1929 |
| 2,037,793 | Jacobson | Apr. 21, 1936 |
| 2,039,734 | Meder | May 5, 1936 |
| 2,108,503 | Murray | Feb. 15, 1938 |
| 2,152,856 | Switzer | Apr. 4, 1939 |
| 2,180,508 | De Fraine | Nov. 21, 1939 |
| 2,297,048 | Britten | Sept. 29, 1942 |

OTHER REFERENCES

Berichte der Deutschen Chem. Gesell, Schmitt et al., vol. 20, pages 2701–2702.

Hackh, Chem. Dict., pub. 1929, Blackiston's Son & Co., page 525, Philadelphia, Pa.